(12) United States Patent
Xie

(10) Patent No.: US 6,791,584 B1
(45) Date of Patent: Sep. 14, 2004

(54) METHOD OF SCALING FACE IMAGE WITH SPECTACLE FRAME IMAGE THROUGH COMPUTER

(76) Inventor: Yiling Xie, 10699 Hickson St., #4, El Monte, CA (US) 91731

( * ) Notice: Subject to any disclaimer, the term of this patent is extended or adjusted under 35 U.S.C. 154(b) by 173 days.

(21) Appl. No.: 09/654,646

(22) Filed: Sep. 5, 2000

(51) Int. Cl.$^7$ ................................................. G09G 5/00
(52) U.S. Cl. ....................... 345/764; 351/227; 351/204; 382/118
(58) Field of Search ................................ 345/189, 660, 345/619, 629, 634, 700, 764, 781, 788, 790, 798–801, 835, 839; 382/115, 117, 118; 351/227, 204

(56) References Cited

U.S. PATENT DOCUMENTS

| | | | | |
|---|---|---|---|---|
| 4,539,585 A | * | 9/1985 | Spackova et al. | 382/100 |
| 5,450,504 A | * | 9/1995 | Calia | 382/118 |
| 6,095,650 A | * | 8/2000 | Gao et al. | 351/227 |
| 6,142,628 A | * | 11/2000 | Saigo | 351/204 |
| 6,231,188 B1 | * | 5/2001 | Gao et al. | 351/227 |
| 6,404,426 B1 | * | 6/2002 | Weaver | 345/419 |
| 6,508,553 B2 | * | 1/2003 | Gao et al. | 351/227 |

* cited by examiner

*Primary Examiner*—Kristine Kincaid
*Assistant Examiner*—Truc T Chuong
(74) *Attorney, Agent, or Firm*—Raymond Y. Chan; David and Raymond Patent Group

(57) ABSTRACT

A method of scaling a face image with a spectacle frame image through computer includes the steps of determining a frame scale of a spectacle frame image provided on a computer display screen of the computer with respect to a real size of the spectacle frame; providing a face image of a user on the computer display screen by inputting a front face picture of the user into the computer; moving a pair of pupil marks provided on the computer display screen to two pupils of the face image by way of a computer input device of the computer until the two pupil marks are positioned concentrically with the two pupils of the face image, wherein a distance between the two pupil marks positioned on the two pupils of the face image is measured and recorded in the computer as an image pupil distance of the face image; inputting a real pupil distance of the user into the computer and determining a face scale of the face image by comparing the real pupil distance with the image pupil distance; adjusting the face scale and the frame scale to the same scale value; and overlapping the spectacle frame image on the face image on the computer display screen until a middle point between the two pupils is overlapped with the midpoint of the spectacle frame image on the computer display screen.

46 Claims, 2 Drawing Sheets

METHOD OF SCALING FACE IMAGE WITH SPECTACLE FRAME IMAGE THROUGH COMPUTER

FIELD OF THE INVENTION

The present invention relates to computer implemented method for test-wearing spectacle frames, and more particularly to a method of scaling a face image with a spectacle frame image through computer, so as to enable the user to view how his or her face looks like while fitly wearing various kinds of spectacle frame by means of a computer.

BACKGROUND OF THE INVENTION

Every eyeglasses wearer would like to test wear all favor spectacles of different styles so as to ensure which style fits his or her face the most before he or she purchases a new pair of spectacles. Although there are thousands of new spectacle designs in market, each spectacle shops may only provide a very limited number of selected spectacles in stock. The user may miss the chance of trying some other spectacle designs before making decision. On the other hands, a spectacle shop may lose a potential customer simply because it fails to carry a particular pair of spectacles that the customer likes.

Due to the rapid development of the Internet, nearly every family in the United States has at least a computer that enables people to shopping through Internet. Numerous spectacle webs are available in Internet, each of which provides pictures of all kinds of spectacles for the consumers to purchase. However, most of the eyeglasses wearers would like to test-wear the selected pair of spectacles to ensure it fits his or her face before purchasing.

Although it is possible for the programmers to design a software that can combine a face image of a user to a spectacle frame image together to show how the user would appear wearing the spectacle frame, the size of the spectacle frame would not be the actual size with respect to the scale of the face image. In other words, although the programmer may determine the actual proportional scale of a particular spectacle frame while inputting the image of the real size spectacle frame into the computer, the computer has no way to determine the scale of the inputted face image. Therefore, the spectacle frame image will not be the actual size with respect to the size of the face image. For example, the spectacle frame image is shown on the computer as half the real size. However, it is generally impossible for the user to determine whether the face image in his or her photograph to be scanned into the computer is also scaled as half the real size of the user face.

Some other systems require the customers to go to one of several designated customer diagnostic locations where some assistants are available to help the customers to measure their face size and to acquire digital images of the customer's face by specific equipment installed at those customer diagnostic locations. Then, the customer later must connect a computer to the remote electronic store that can provide images to the computer of how the customer would appear wearing different eyeglasses. It is because both the computer and the remote electronic store have no way to scale the image size with the actual size of the customer's face. However, it is too troublesome and also not practical to have the customers to go somewhere to input their digital images and go some other place for viewing how they would appear wearing various eyeglasses. If the customer has a new haircut and wants to have another digital image of his or her face, the customer has to go back to one of the designated customer diagnostic locations to input another digital image. Moreover, the size of the digital image must be remained constant in order to match the scale of the eyeglasses' digital images.

SUMMARY OF THE INVENTION

It is an objective of the present invention to provide a method of scaling a face image with a spectacle frame image through computer, which enables the user to view on a computer how his or her face looks like while fitly wearing various kinds of spectacle frame.

It is another objective of the present invention to provide a method of scaling a face image with a spectacle frame image through computer, wherein the user may input a face image of any size into the computer by scanning in a photograph of the user's front face or taking a digital picture through a digital camera connected to the computer, and the present method can fittedly adjust the face image and the spectacle frame image to the same scale of their real sizes so as to enable the user to view his or her real look of the spectacle frame on his or her face.

It is another objective of the present invention to provide a method of scaling a face image with a spectacle frame image through computer, wherein the user may view an image of the user's face for showing how the user would appear while wearing different spectacle frames through the computer at home or the spectacle shop, or via Internet.

It is another objective of the present invention to provide a method of scaling a face image with a spectacle frame image through computer, wherein the user can input his or her face image of any size into the computer and the user can scale his or her face image with all the spectacle images through the same computer by means of the scaling method of the present invention.

It is another objective of the present invention to provide a method of scaling a face image with a spectacle frame image through computer, wherein once user set the scale of his or her face image through the computer, whenever the user changes the size of his or her face image, the displaying spectacle image can change its size correspondingly.

In order to accomplish the above objectives, the present invention provides a method of scaling a face image with a spectacle frame image through computer, which comprises the steps of:

(a) providing a spectacle frame image of a spectacle frame in a computer and determining a mid-point of the spectacle frame image, wherein the spectacle frame image is a front view of the spectacle frame without temples;

(b) determining a frame scale of the spectacle frame image on a computer display screen of the computer with respect to a real size of the spectacle frame;

(c) providing a face image of a user on the computer display screen by inputting a front face picture of the user into the computer;

(d) providing a pair of pupil marks on the computer display screen;

(e) moving the pair of pupil marks to two pupils of the face image by means of a computer input device of the computer until the two pupil marks are positioned concentrically with the two pupils of the face image, wherein a distance between the two pupil marks positioned on the two pupils of the face image is measured and recorded in the computer as an image pupil distance of the face image;

(f) inputting a real pupil distance of the user into the computer and determining a face scale of the face image by comparing the real pupil distance with the image pupil distance;

(g) adjusting the face scale and the frame scale to the same scale value so as to render both sizes of the face image and the spectacle frame image being proportionally displayed on the computer display screen; and (h) overlapping the spectacle frame image on the face image on the computer display screen until a middle point between the two pupil marks or the two pupils is overlapped with the mid-point of the spectacle frame image on the computer display screen.

DETAILED DESCRIPTION OF THE PREFERRED EMBODIMENT

Figure 1:
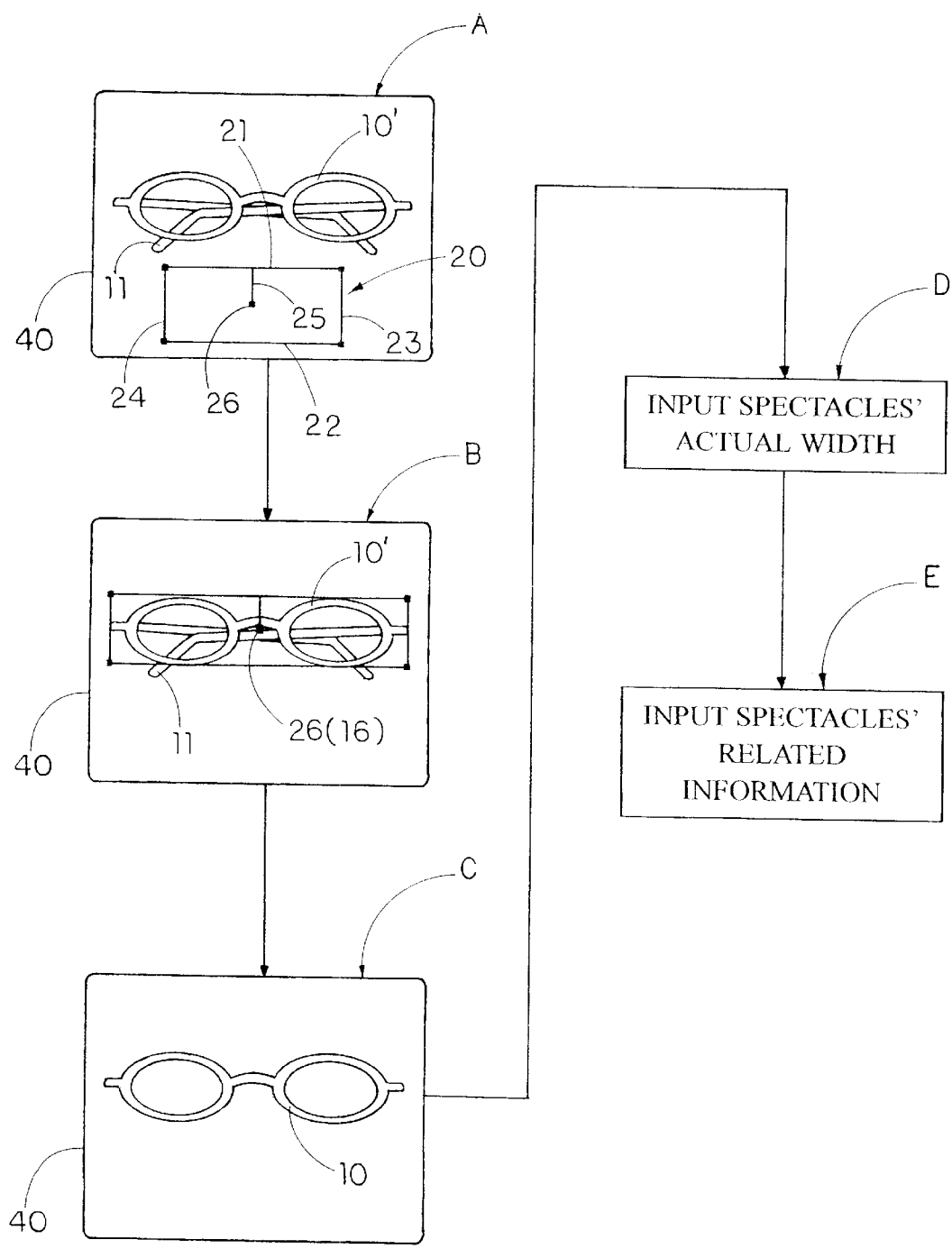
FIG. 1 is a flow diagram illustrating the process of providing spectacle frame images according to a preferred embodiment of the present invention.
Figure 2:
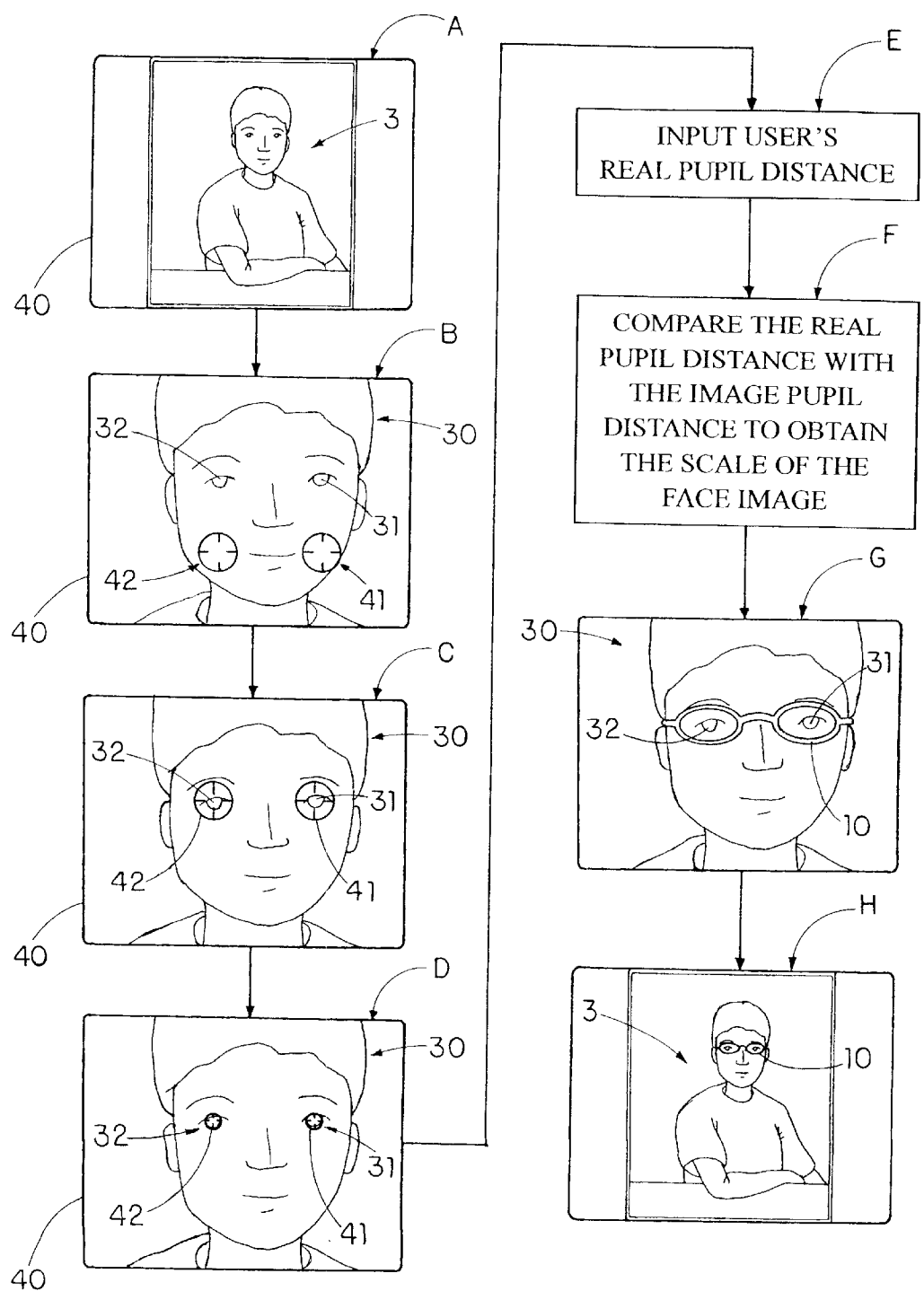
FIG. 2 is a flow diagram illustrating the process of inputting the user's face image and scaling the face image with the spectacle frame image according to the above preferred embodiment of the present invention.

Referring to FIGS. 1 and 2, a method of scaling a face image with a spectacle frame image through computer according to a preferred embodiment of the present invention is illustrated.

It is worth to mention that there are more than one way to input and store a face image in a computer, such as using a digital camera or a digital video camera to take a digital photograph and download into the computer memory, or using a scanner to scan in a picture of the user into the computer memory. Similarly, there is no problem for inputting and storing front view pictures of spectacle frames in the computer memory.

However, how to determine the relationship between the real size of the user face and the image size of the user's face image and how to scale the face image of the user with the spectacle frame image are the greatest unsolved problems for enabling the user to view his or her real appearance while wearing various eyeglasses.

Most of the graphic softwares are capable of magnifying and shrinking a graphic image on the display screen of the computer, such as monitor. Therefore, the only method for showing how the user would appear while wearing various different eyeglasses is to magnify or shrink the spectacle frame image to fit the face image of the user. But, such a combined display image of the face image of the user and the spectacle frame image of a specific spectacle frame is not a "real image" because the scale of the face image basically will not be the same scale of the spectacle frame image.

The present invention successfully suggests a solution of how to scale the face image with the spectacle frame image precisely. According to the preferred embodiment, the method of scaling face image with spectacle frame image through computer comprises the following steps.

(a) Provide a spectacle frame image 10 of a spectacle frame in a computer and determining a spectacle mid-point 16 of the spectacle frame image 10, wherein the spectacle frame image 10 is a front view of the spectacle frame without temples 11.

(b) Determine a frame scale of the spectacle frame image 10 on a computer display screen 40 of the computer with respect to a real size of the spectacle frame.

(c) Provide a face image 30 of a user on the computer display screen 40 by inputting a front face picture of the user into the computer.

(d) Provide a pair of pupil marks 41, 42 on the computer display screen 40.

(e) Move the pair of pupil marks 41, 42 to two pupils 31, 32 of the face image 30 by means of a computer input device of the computer, such as mouse, until the two pupil marks 41, 42 are positioned concentrically with the two pupils 31, 32 of the face image 30, wherein a distance between the two pupil marks 41, 42 positioned on the two pupils 31, 32 of the face image 30 is measured and recorded in the computer as an image pupil distance of the face image 30.

(f) Input a real pupil distance of the user into the computer and determine a face scale of the face image 30 by comparing the real pupil distance with the image pupil distance.

(g) Adjust the face scale and the frame scale to the same scale value so as to render both sizes of the face image 30 and the spectacle frame image 10 being proportionally displayed on the computer display screen 40.

(h) Overlap the spectacle frame image 10 on the face image 30 on the computer display screen 40 until a pupil mid-point between the two pupil marks 41, 42 or the two pupils 31, 32 is overlapped with the spectacle mid-point 16 of the spectacle frame image 10 on the computer display screen 40.

As shown in FIG. 1, in order to enable the user to view how he or she appears while wearing different styles of eyeglasses through the display screen of the computer, the different sizes and images of all different spectacle frames should be preloaded in the electronic memory unit of the computer. Also, we have to find out the scale of spectacle frame image as shown in the display screen with respect to the real size of the spectacle frame. This is carried out by the steps (a) and (b) of the present invention.

As shown in FIG. 1, the step (a) further comprises the steps of:

(a-1) inputting a front view of each of the different styles of the spectacle frame as a preliminary spectacle frame image 10' in the computer and storing the preliminary spectacle frame image 10' in the electronic memory unit, such as the hard disc of the computer or the server of the internet, as shown in FIG. 1-A;

(a-2) providing a scale box 20 having a top bar 21, a bottom bar 22, two side bars 23, 24, and a mid bar 25 extended from a middle point of the top bar 21 to a center of the scale box 20 to form a center mark 26, wherein the length of the top bar 21 or the bottom bar 22 is the width of the scale box 20 and the length of the side bars is the height of the scale box 20, and that the length of the mid bar 25 equals to half the length of the side bar 23, 24, as shown in FIG. 1-A;

(a-3) moving the scale box 20 to frame the preliminary spectacle frame image 10' on the display screen by operating the computer input device of the computer, such as the mouse, wherein the top bar 21 is move to just in contact with the top edge of the preliminary spectacle frame image 10', the bottom bar 22 is move to just in contact with the bottom edge of the spectacle frame image 10, and the two side bars 23, 24 are respectively move to just in contact with the two side edges of the preliminary spectacle frame image 10', as shown in FIG. 1-B, so that the position of the center mark 26 accurately locates a mid-point of the preliminary spectacle frame image 10'; and (a-4) removing the two temples 11 from the preliminary spectacle frame image 10' to form the spectacle frame image 10, as shown in FIG. 1-C.

As shown in FIG. 1, the step (b) comprises the steps of:

(b-1) inputting at least a real width of the actual spectacle frame, i.e. the distance between the outermost left edge and the outermost right edge of the actual spectacle frame; and (b-2) determining the frame scale of the spectacle frame image 10 by comparing the real width of the actual spectacle frame with the width of the scale box 20, i.e. the length of the top bar 21 or bottom bar 22, as shown in FIG. 1-D.

For example, if the real width of the actual spectacle frame is 110 mm and the width of the scale box 20, that is the image width of the spectacle frame image 10, is 55 mm, the frame scale of the spectacle frame image 10 is "0.5".

After the step (b), the method may further comprises the step of inputting related information of the real spectacle frame of the respective spectacle frame image, such as size, color, manufacturer, trademark, temple length, and etc., so as to facilitate the user to select different spectacle frame images 10 to wear on his or her face image 30, as shown in FIG. 1-E.

As shown in FIG. 2, the step (c) comprises the steps of:

(c-1) inputting the front picture of the user as a picture image 3 into the computer and storing the picture image 3 in the electronic memory unit, such as the hard disc of the computer or the server of the internet, by scanning a front view photograph of the user into the computer, or by taking a digital photograph by a digital camera and downloading the digital photograph into the computer, as shown in FIG. 2-A;

(c-2) adjusting, either magnifying or shrinking, a size of the picture image 3 until the face of the user fits the computer display screen to form the face image 30, as shown in FIG. 2-B;

The user may save one or more face images 30 in the electronic memory unit and select a particular preloaded face image 30 to appear on the computer display screen 40 when needed.

In the step (d), the pair of pupil marks 41, 42 are provided at a standby position of the computer display screen 40, such as the bottom portion of the computer display screen 40 as shown in FIG. 2-B, wherein a constant distance is set between the two pupil marks 41, 42. Moreover, the pair of pupil marks 41, 42 is normally displayed in their normal diameter, generally about an real eyeball diameter, at the standby position and each indicates a mark center.

The step (e) further comprises the following steps:

(e-1) Operate his or her mouse, if a mouse is used as the computer input device, until the mouse mark on the computer display screen 40 is move to position on one of the pupil marks 41; click and hold the mouse button of the mouse to move the selected pupil mark 41 to one of the pupils 31 of the user's face image 30; release the click and hold of the mouse button to keep the selected pupil 41 overlapped on the respective pupil 31; repeat the above procedures to move another pupil marks 42 to overlap on the other pupil 32 of the user's face image, so as to put the pair of pupil marks 41, 42 positioned on the pair of pupils 31, 32 of the face image 30 of the user, as shown in FIG. 2-C.

(e-2) As shown in FIG. 2-D, shrink by reducing the diameter of the two pupil marks 41, 42 to fit the diameter of the two pupils 31, 32 of the face image 30, so as to ensure the two pupil marks 41, 42 are positioned concentrically with the two pupil 31, 32 respectively.

(e-3) Measure and record the distance between the two pupil marks 41, 42, which are positioned concentrically on the two pupils 31, 32 of the face image 30, in the electronic memory unit as an image pupil distance of the face image 30.

(e-4) Find out a pupil mid-point which is a center position between the two pupils 31, 32 of the face image.

In step (f), as shown in FIG. 2-E, a real pupil distance of the user is input into the computer through another computer input device, such as a keyboard. Then, as shown in FIG. 2-F, the real pupil distance and the image pupil distance are compared to determine the "face scale" of the face image. After finding out the face scale, the two pupil marks 41, 42 should be removed from the computer display screen 40.

For example, if the real pupil distance of the user is 75 mm and the image pupil distance is measured as 52.5 mm. The face scale is 0.7, i.e. 52.5 mm divided by 75 mm. In other words, the face image 30 is only 70% of the real size of the real face of the user.

It is preferred for the user to key in the doctor's prescription of pupil distance as the real pupil distance. Therefore, the prescribed real pupil distance of the user can be saved in the electronic memory unit at the same time. However, for those users who have neither short sight nor long sight but just want to view their appearance of wearing different styles of sunglasses, they may not have prescribed real pupil distance. Then, they may simply measure their pupil distance by themselves and input into the computer.

After the user obtains his or her face scale through the above steps (e) and (f), the user can thus select any particular spectacle frame image with designated style from the database of spectacle frame images preloaded in the electronic memory unit. Once a particular spectacle frame image is selected, its frame scale will automatically adjust to same as the face scale, for example "0.7", and then the same proportional spectacle frame image 10 is displayed on the face image 30 on the computer display screen 40 as if the user's face image 30 is wearing the selected spectacle frame, as shown in FIG. 2-G, where the spectacle frame image 10 is aligned with the face image 30 by overlapping the spectacle mid-point 16 of the spectacle frame image with the pupil mid-point of the face image, so that the user can examine how he or she would appear wearing with such selected spectacle frame.

If the face scale is 0.7, the face image 30 is only 70% in size of the real face. Since the frame scale is also set to 0.7 accordingly, the spectacle frame image 10 is also 70% in size of the real spectacle frame. In order words, the proportional image of the face image 30 with respect to the spectacle frame image 10 just likes the real face with that particular spectacle frame.

Sometimes, the two eyes are not shaped and aligned symmetrically. After the step (h), the method may further comprises an additional step (i) of fine adjusting the position of the spectacle frame image 10 to fit the face image 30 of the user for better look.

Once the face scale and the spectacle scale are set to a same value, the user can freely adjust the size of the face image, such as shrinking down the size to view the entire picture image 3. The size of the spectacle frame image 10 will be reduced accordingly and proportionally.

The method of scaling face image with spectacle frame image can be provided by a personal computer, so that a spectacle shop can enable the customer to examine how the customer would appear wearing a lot more different styles or bands spectacle frame through the personal computer. In which, the spectacle frame images of different spectacle frames are saved in the hard disc of personal computer. The user may input more than one face images thereof to save in the hard disc of the personal computer. The calculation of the face scale and the frame scale and the matching of the face scale and the frame scale can be computed by the central processor unit of the personal computer.

To home user, the user may connect his or her computer to a web server through the internet and download his or her one or more front pictures to the web server and saved as face images. The face scale is computed and saved in the web server. The spectacle frame images of all kinds of spectacle frame are preloaded by the web server and the frame scales is control by the web server to match with the face scale as shown in the computer display screen of the user's computer, so that the user can scale his or her face image with a selected spectacle frame image downloaded from the web server to the user's computer and enable the user to examine how he or she appears wearing the selected spectacle frame image through the computer display screen of his or her computer.

By means of the scaling method of the present invention, the user can view how his or her face appears wearing as many as different kinds of spectacles at home. Therefore, the user may purchase any particular spectacle frame from the web server. Since the prescribed pupil distance of the user is inputted, if other prescription eye information is also input and downloaded to the web server, the web server host may also provide the service of making the specific lenses for selling with the designated spectacle frame to the user according to the user's optical prescription information, so that the user may purchase a whole set of spectacles through the internet at relatively low cost.

Moreover, the scaling method of the present invention can solve a long felt need problem. When the optician makes the lenses for the customer, the optician generally has no idea of how the customer's face looks like and how the actual size of the customer's face related with the purchased spectacle frame and lenses. By means of the scaling method of the present invention, the customer may input his face image into the computer and obtain the face scale by inputting his or her real pupil distance, so that a face image of the customer and his or her purchased spectacle frame image can be provided for the optician as if the customer is wearing the purchased spectacle frame in actual proportion. The optician can substantially examine the actual relationship between the customer's face and the spectacles, so that the optician can also make some fine adjustment of the size and shape of the spectacle frame to better fit the face of the customer.

What is claimed is:

1. A method of scaling a face image with a spectacle frame image, comprising the steps of:
   (a) providing a spectacle frame image of a spectacle frame in a computer and determining a spectacle mid-point of said spectacle frame image, wherein said spectacle frame image is a front view of said spectacle frame without temples;
   (b) determining a frame scale of said spectacle frame image on a computer display screen of said computer with respect to a real size of said spectacle frame;
   (c) providing a face image of a user on said computer display screen by inputting a front face picture of said user into said computer;
   (d) providing a pair of pupil marks on said computer display screen;
   (e) moving said pair of pupil marks to two pupils of said face image by means of a computer input device of said computer until said two pupil marks are positioned concentrically with said two pupils of said face image, wherein a distance between said two pupil marks positioned on said two pupils of said face image is measured and recorded in said computer as an image pupil distance of said face image;
   (f) inputting a real pupil distance of said user into said computer and determine a face scale of said face image by comparing said real pupil distance with said image pupil distance;
   (g) adjusting said face scale and said frame scale to same scale value rendering both sizes of said face image and said spectacle frame image being proportionally displayed on said computer display screen; and
   (h) overlapping said spectacle frame image on said face image on said computer display screen until a pupil mid-point between said two pupils is overlapped with said spectacle mid-point of said spectacle frame image on said computer display screen.

2. The method as recited in claim 1 wherein a plurality of different spectacle frames having different sizes and shaped are each preloaded in an electronic memory unit of said computer as different spectacle frame images by proceeding the steps (a) and (b).

3. The method as recited in claim 1 wherein the step (a) comprises the steps of:
   (a-1) inputting a front view of said spectacle frame as a preliminary spectacle frame image in said computer and storing said preliminary spectacle frame image in an electronic memory unit;
   (a-2) providing a scale box having a top bar, a bottom bar, two side bars, and a mid bar extended from a middle point of said top bar to a center of said scale box to form a center mark, wherein a length of said top bar or said bottom bar is a width of said scale box and a length of said side bars is a height of said scale box, and that a length of said mid bar equals to half said length of said side bar;
   (a-3) moving said scale box to frame said preliminary spectacle frame image on said display screen by operating said computer input device of said computer, wherein said top bar is move to in contact with said top edge of said preliminary spectacle frame image, said bottom bar is move to in contact with said bottom edge of said spectacle frame image, and said two side bars are respectively move to in contact with said two side edges of said preliminary spectacle frame image, wherein a position of said center mark accurately locates a mid-point of said preliminary spectacle frame image; and
   (a-4) removing said two temples from said preliminary spectacle frame image to form said spectacle frame image.

4. The method as recited in claim 1 wherein the step (b) comprises the steps of:
   (b-1) inputting a real width of said actual spectacle frame, that is a distance between an outermost left edge and an outermost right edge of said actual spectacle frame; and
   (b-2) determining said frame scale of said spectacle frame image by comparing said real width of said actual spectacle frame with a width of said spectacle frame image as shown in said computer display screen.

5. The method as recited in claim 3 wherein the step (b) comprises the steps of:

(b-1) inputting a real width of said actual spectacle frame, that is a distance between an outermost left edge and an outermost right edge of said actual spectacle frame; and (b-2) determining said frame scale of said spectacle frame image by comparing said real width of said actual spectacle frame with said width of said scale box, that is said length of said top bar or bottom bar.

6. The method as recited in claim 4 wherein, after the step (b-2), the step (b) further comprises the step (b-3) of inputting related information of said real spectacle frame in respective to said spectacle frame image, including size, color, manufacturer, trademark, and temple length.

7. The method as recited in claim 5 wherein, after the step (b-2), the step (b) further comprises the step (b-3) of inputting related information of said real spectacle frame in respective to said spectacle frame image, including size, color, manufacturer, trademark, and temple length.

8. The method as recited in claim 1 wherein the step (c) comprises the steps of:

(c-1) inputting a front picture of said user as a picture image into said computer and storing said picture image in an electronic memory unit; and (c-2) adjusting a size of said picture image until said face of said user fits said computer display screen to form said face image.

9. The method as recited in claim 3 wherein the step (c) comprises the steps of:

(c-1) inputting a front picture of said user as a picture image into said computer and storing said picture image in said electronic memory unit; and (c-2) adjusting a size of said picture image until said face of said user fits said computer display screen to form said face image.

10. The method as recited in claim 4 wherein the step (c) comprises the steps of:

(c-1) inputting a front picture of said user as a picture image into said computer and storing said picture image in an electronic memory unit; and (c-2) adjusting a size of said picture image until said face of said user fits said computer display screen to form said face image.

11. The method as recited in claim 5 wherein the step (c) comprises the steps of:

(c-1) inputting a front picture of said user as a picture image into said computer and storing said picture image in said electronic memory unit; and (c-2) adjusting a size of said picture image until said face of said user fits said computer display screen to form said face image.

12. The method as recited in claim 1 wherein, in the step (d), said pair of pupil marks are provided at a standby position of said computer display screen, wherein a constant distance is set between said two pupil marks, wherein said pair of pupil marks is normally displayed in a normal diameter thereof at said standby position and each indicates a mark center.

13. The method as recited in claim 3 wherein, in the step (d), said pair of pupil marks are provided at a standby position of said computer display screen, wherein a constant distance is set between said two pupil marks, wherein said pair of pupil marks is normally displayed in a normal diameter thereof at said standby position and each indicates a mark center.

14. The method as recited in claim 4 wherein, in the step (d), said pair of pupil marks are provided at a standby position of said computer display screen, wherein a constant distance is set between said two pupil marks, wherein said pair of pupil marks is normally displayed in a normal diameter thereof at said standby position and each indicates a mark center.

15. The method as recited in claim 5 wherein, in the step (d), said pair of pupil marks are provided at a standby position of said computer display screen, wherein a constant distance is set between said two pupil marks, wherein said pair of pupil marks is normally displayed in a normal diameter thereof at said standby position and each indicates a mark center.

16. The method as recited in claim 8 wherein, in the step (d), said pair of pupil marks are provided at a standby position of said computer display screen, wherein a constant distance is set between said two pupil marks, wherein said pair of pupil marks is normally displayed in a normal diameter thereof at said standby position and each indicates a mark center.

17. The method as recited in claim 9 wherein, in the step (d), said pair of pupil marks are provided at a standby position of said computer display screen, wherein a constant distance is set between said two pupil marks, wherein said pair of pupil marks is normally displayed in a normal diameter thereof at said standby position and each indicates a mark center.

18. The method as recited in claim 10 wherein, in the step (d), said pair of pupil marks are provided at a standby position of said computer display screen, wherein a constant distance is set between said two pupil marks, wherein said pair of pupil marks is normally displayed in a normal diameter thereof at said standby position and each indicates a mark center.

19. The method as recited in claim 11 wherein, in the step (d), said pair of pupil marks are provided at a standby position of said computer display screen, wherein a constant distance is set between said two pupil marks, wherein said pair of pupil marks is normally displayed in a normal diameter thereof at said standby position and each indicates a mark center.

20. The method as recited in claim 12 wherein the step (e) comprises the steps of:

(e-1) moving said pair of pupil marks to position on said two pupils of said face image on said computer display screen by operating said computer input device;

(e-2) shrinking by reducing a diameter of said two pupil marks to fit a diameter of said two pupils of said face image, so as to ensure said two pupil marks are positioned concentrically with said two pupil respectively;

(e-3) measuring and recording a distance between said two pupil marks which are positioned concentrically on said two pupils of said face image in said electronic memory unit as said image pupil distance of said face image; and (e-4) finding out said pupil mid-point which is a center position between said two pupils of said face image.

21. The method as recited in claim 13 wherein the step (e) comprises the steps of:

(e-1) moving said pair of pupil marks to position on said two pupils of said face image on said computer display screen by operating said computer input device;

(e-2) shrinking by reducing a diameter of said two pupil marks to fit a diameter of said two pupils of said face image, so as to ensure said two pupil marks are positioned concentrically with said two pupil respectively;

(e-3) measuring and recording a distance between said two pupil marks which are positioned concentrically on said two pupils of said face image in said electronic memory unit as said image pupil distance of said face image; and (e-4) finding out said pupil mid-point which is a center position between said two pupils of said face image.

22. The method as recited in claim 14 wherein the step (e) comprises the steps of:

(e-1) moving said pair of pupil marks to position on said two pupils of said face image on said computer display screen by operating said computer input device;

(e-2) shrinking by reducing a diameter of said two pupil marks to fit a diameter of said two pupils of said face image, so as to ensure said two pupil marks are positioned concentrically with said two pupil respectively;

(e-3) measuring and recording a distance between said two pupil marks which are positioned concentrically on said two pupils of said face image in said electronic memory unit as said image pupil distance of said face image; and (e-4) finding but said pupil mid-point which is a center position between said two pupils of said face image.

23. The method as recited in claim 15 wherein the step (e) comprises the steps of:

(e-1) moving said pair of pupil marks to position on said two pupils of said face image on said computer display screen by operating said computer input device;

(e-2) shrinking by reducing a diameter of said two pupil marks to fit a diameter of said two pupils of said face image, so as to ensure said two pupil marks are positioned concentrically with said two pupil respectively;

(e-3) measuring and recording a distance between said two pupil marks which are positioned concentrically on said two pupils of said face image in said electronic memory unit as said image pupil distance of said face image; and (e-4) finding out said pupil mid-point which is a center position between said two pupils of said face image.

24. The method as recited in claim 16 wherein the step (e) comprises the steps of:

(e-1) moving said pair of pupil marks to position on said two pupils of said face image on said computer display screen by operating said computer input device;

(e-2) shrinking by reducing a diameter of said two pupil marks to fit a diameter of said two pupils of said face image, so as to ensure said two pupil marks are positioned concentrically with said two pupil respectively;

(e-3) measuring and recording a distance between said two pupil marks which are positioned concentrically on said two pupils of said face image in said electronic memory unit as said image pupil distance of said face image; and (e-4) finding out said pupil mid-point which is a center position between said two pupils of said face image.

25. The method as recited in claim 17 wherein the step (e) comprises the steps of:

(e-1) moving said pair of pupil marks to position on said two pupils of said face image on said computer display screen by operating said computer input device;

(e-2) shrinking by reducing a diameter of said two pupil marks to fit a diameter of said two pupils of said face image, so as to ensure said two pupil marks are positioned concentrically with said two pupil respectively;

(e-3) measuring and recording a distance between said two pupil marks which are positioned concentrically on said two pupils of said face image in said electronic memory unit as said image pupil distance of said face image; and (e-4) finding out said pupil mid-point which is a center position between said two pupils of said face image.

26. The method as recited in claim 18 wherein the step (e) comprises the steps of:

(e-1) moving said pair of pupil marks to position on said two pupils of said face image on said computer display screen by operating said computer input device;

(e-2) shrinking by reducing a diameter of said two pupil marks to fit a diameter of said two pupils of said face image, so as to ensure said two pupil marks are positioned concentrically with said two pupil respectively;

(e-3) measuring and recording a distance between said two pupil marks which are positioned concentrically on said two pupils of said face image in said electronic memory unit as said image pupil distance of said face image; and (e-4) finding out said pupil mid-point which is a center position between said two pupils of said face image.

27. The method as recited in claim 19 wherein the step (e) comprises the steps of:

(e-1) moving said pair of pupil marks to position on said two pupils of said face image on said computer display screen by operating said computer input device;

(e-2) shrinking by reducing a diameter of said two pupil marks to fit a diameter of said two pupils of said face image, so as to ensure said two pupil marks are positioned concentrically with said two pupil respectively;

(e-3) measuring and recording a distance between said two pupil marks which are positioned concentrically on said two pupils of said face image in said electronic memory unit as said image pupil distance of said face image; and (e-4) finding out said pupil mid-point which is a center position between said two pupils of said face image.

28. The method as recited in claim 27 wherein the step (e-1) comprises the steps of:

(e-1-1) operating said computer input device which is a mouse until a mouse mark on said computer display screen is move to position on one of said pupil marks;

(e-1-2) clicking and holding a mouse button of said mouse to move said selected pupil mark to one of said pupils of said user's face image;

(e-1-3) releasing said clicking and holding of said mouse button to keep said selected pupil overlapped on said respective pupil; and (e-1-4) repeating the steps (e-1-1), (e-1-2) and (e-1-3) to move another pupil marks to overlap on said other pupil of said face image, so as to put said pair of pupil marks positioned on said pair of pupils of said face image of said user.

29. The method as recited in claim 1 wherein in the step (f), after said face scale is determined, said two pupil marks are removed from said computer display screen.

30. The method as recited in claim 28 wherein in the step (f), after said face scale is determined, said two pupil marks are removed from said computer display screen.

31. The method as recited in claim 1 wherein said face scale is obtained by dividing said image pupil distance by said real pupil distance and said frame scale is obtained by said width of said spectacle frame image by said width of said real spectacle frame.

32. The method as recited in claim 30 wherein said face scale is obtained by dividing said image pupil distance by said real pupil distance and said frame scale is obtained by said width of said spectacle frame image by said width of said spectacle frame.

33. The method as recited in claim 1 wherein in the step (f) said real pupil distance is a prescribed pupil distance according to a prescription of an optical doctor.

34. The method as recited in claim 32 wherein in the step (f) said real pupil distance is a prescribed pupil distance according to a prescription of an optical doctor.

35. The method as recited in claim 1 wherein, after the step (h), further comprises an additional step (i) of fine adjusting a position of said spectacle frame image overlapped on said face image to fit said face image of said user for better look.

36. The method as recited in claim 20 wherein, after the step (h), further comprises an additional step (i) of fine adjusting a position of said spectacle frame image overlapped on said face image to fit said face image of said user for better look.

37. The method as recited in claim 21 wherein, after the step (h), further comprises an additional step (i) of fine adjusting a position of said spectacle frame image overlapped on said face image to fit said face image of said user for better look.

38. The method as recited in claim 22 wherein, after the step (h), further comprises an additional step (i) of fine adjusting a position of said spectacle frame image overlapped on said face image to fit said face image of said user for better look.

39. The method as recited in claim 23 wherein, after the step (h), further comprises an additional step (i) of fine adjusting a position of said spectacle frame image overlapped on said face image to fit said face image of said user for better look.

40. The method as recited in claim 24 wherein, after the step (h), further comprises an additional step (i) of fine adjusting a position of said spectacle frame image overlapped on said face image to fit said face image of said user for better look.

41. The method as recited in claim 25 wherein, after the step (h), further comprises an additional step (i) of fine adjusting a position of said spectacle frame image overlapped on said face image to fit said face image of said user for better look.

42. The method as recited in claim 26 wherein, after the step (h), further comprises an additional step (i) of fine adjusting a position of said spectacle frame image overlapped on said face image to fit said face image of said user for better look.

43. The method as recited in claim 27 wherein, after the step (h), further comprises an additional step (i) of fine adjusting a position of said spectacle frame image overlapped on said face image to fit said face image of said user for better look.

44. The method as recited in claim 30 wherein, after the step (h), further comprises an additional step (i) of fine adjusting a position of said spectacle frame image overlapped on said face image to fit said face image of said user for better look.

45. The method as recited in claim 32 wherein, after the step (h), further comprises an additional step (i) of fine adjusting a position of said spectacle frame image overlapped on said face image to fit said face image of said user for better look.

46. The method as recited in claim 34 wherein, after the step (h), further comprises an additional step (i) of fine adjusting a position of said spectacle frame image overlapped on said face image to fit said face image of said user for better look.

* * * * *